United States Patent
Baumann

(10) Patent No.: US 11,046,265 B2
(45) Date of Patent: Jun. 29, 2021

(54) VEHICLE ELECTRICAL SYSTEM ARRANGEMENT FOR A MOTOR VEHICLE

(71) Applicant: Dr. Ing. h.c. F. Porsche Aktiengesellschaft, Stuttgart (DE)

(72) Inventor: Malte Baumann, Murr (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 167 days.

(21) Appl. No.: 15/913,201

(22) Filed: Mar. 6, 2018

(65) Prior Publication Data

US 2018/0257585 A1  Sep. 13, 2018

(30) Foreign Application Priority Data

Mar. 9, 2017 (DE) .......................... 102017104977.0

(51) Int. Cl.
| | | |
|---|---|---|
| *B60R 16/033* | (2006.01) | |
| *H02J 9/06* | (2006.01) | |
| *B60R 16/03* | (2006.01) | |

(52) U.S. Cl.
CPC ............ *B60R 16/033* (2013.01); *B60R 16/03* (2013.01); *H02J 9/061* (2013.01); *H02J 9/068* (2020.01)

(58) Field of Classification Search
CPC .......... H01M 6/50; H01M 6/5033; H02J 7/35; H02J 2310/46; H02J 1/08; H02J 7/1461; H02J 9/061; H02J 9/068; H02J 1/00; H02J 9/04; H01G 11/08; B60R 16/03; B60R 16/033
USPC ................................................. 307/9.1, 10.7
See application file for complete search history.

(56) References Cited

U.S. PATENT DOCUMENTS

| | | | | |
|---|---|---|---|---|
| 4,479,083 A | * | 10/1984 | Sullivan ................ | H02J 7/0018 320/123 |
| 2008/0006491 A1 | | 1/2008 | Degoul et al. | |
| 2009/0315401 A1 | * | 12/2009 | Yoshida ............... | G11C 27/024 307/44 |

FOREIGN PATENT DOCUMENTS

| | | |
|---|---|---|
| DE | 3502100 A1 | 7/1986 |
| DE | 10014243 A1 | 10/2001 |
| DE | 10317362 A1 | 11/2004 |
| DE | 102012003309 A1 | 8/2013 |
| DE | 102012207624 A1 | 11/2013 |

(Continued)

OTHER PUBLICATIONS

Translation of JP 2003244937 (Year: 2003).*

(Continued)

*Primary Examiner* — Rexford N Barnie
*Assistant Examiner* — Elim Ortiz
(74) *Attorney, Agent, or Firm* — RatnerPrestia

(57) ABSTRACT

A vehicle electrical system arrangement for a motor vehicle, having a battery apparatus to which a primary vehicle electrical system and at least one secondary vehicle electrical system are electrically conductively connected, wherein the primary vehicle electrical system has a primary set of loads and the secondary vehicle electrical system has a secondary set of loads, wherein further a backup battery is connected to the primary vehicle electrical system and to the secondary vehicle electrical system via a switching apparatus, and the switching apparatus has at least one primary switching position for an electrically conductive connection to the primary vehicle electrical system and a secondary switching position for an electrically conductive connection to the secondary vehicle electrical system.

7 Claims, 2 Drawing Sheets

(56) References Cited

FOREIGN PATENT DOCUMENTS

| | | | | |
|---|---|---|---|---|
| JP | 2003244937 A | * | 8/2003 | |
| JP | 2003244937 A | | 8/2003 | |
| WO | 2005110814 A1 | | 11/2005 | |
| WO | WO-2005110814 A1 | * | 11/2005 | ............... B60T 13/74 |
| WO | WO-2015082113 A1 | * | 6/2015 | ............ H02J 7/1461 |

OTHER PUBLICATIONS

Translation of WO 2005110814 (Year: 2005).*
Notification of Reason for Rejection for Japanese Application No. 2018-041419, dated Jan. 15, 2019, 3 pages.
German Search Report for German Application No. 10 2017 104 977.0, dated Dec. 15, 2017 with partial English translation, 8 Pages.
Chinese Office Action for Chinese Application No. 201810185232.7, dated Oct. 12, 2020, 7 pages.

* cited by examiner

VEHICLE ELECTRICAL SYSTEM
ARRANGEMENT FOR A MOTOR VEHICLE

CROSS-REFERENCE TO RELATED
APPLICATIONS

This application claims priority under 35 U.S.C. § 119 to German Patent Application No. DE 10 2017 104 977.06, filed Mar. 9, 2017, which is incorporated by reference herein in its entirety.

FIELD OF THE INVENTION

The present invention relates to a vehicle electrical system arrangement for a motor vehicle and to a method for operating a vehicle electrical system arrangement.

BACKGROUND OF THE INVENTION

Vehicle electrical system arrangements and methods for operating a vehicle electrical system arrangement for motor vehicles are fundamentally known. Particularly given the ever increasing automation of the driving operation of vehicles, it is necessary for the redundancy of the system supply for individual electrical loads to be ensured with ever greater certainty. One option for providing such redundancy in this case is to configure different vehicle electrical systems in the form of a primary vehicle electrical system and n in the form of a secondary vehicle electrical system. If the primary vehicle electrical system fails, this can lead to the secondary vehicle electrical system being able to maintain the operation of safety-relevant electrical loads.

A disadvantage of the known solutions, however, is that each vehicle electrical system in a motor vehicle requires what is known as a backup battery. Such a backup battery is used to provide support for the fluctuating power consumption by means of a voltage converter apparatus or to equalize voltage variations. If a primary vehicle electrical system and a secondary vehicle electrical system are now provided to configure a redundant vehicle electrical system in the form of a vehicle electrical system arrangement, then a second and additional backup battery also needs to be provided in the case of known redundant embodiments. Besides the necessary space requirement for the second backup battery, the additional weight and the additional costs are a large disadvantageous factor in a configuration of the redundancy of this manner.

SUMMARY OF THE INVENTION

It is an object of the present invention to at least partly overcome the problems described above. In particular, it is an object of the present invention to provide the redundancy in a vehicle electrical system arrangement in an inexpensive and simple manner and, in particular, to obtain an improvement in respect of weight, costs and/or space requirement.

The above object is achieved by a vehicle electrical system arrangement having a battery apparatus to which a primary vehicle electrical system and at least one secondary vehicle electrical system are electrically conductively connected, wherein the primary vehicle electrical system has a primary set of loads and the secondary vehicle electrical system has a secondary set of loads, wherein further a backup battery is connected to the primary vehicle electrical system and to the secondary vehicle electrical system via a switching apparatus, and the switching apparatus has at least one primary switching position for an electrically conductive connection to the primary vehicle electrical system and a secondary switching position for an electrically conductive connection to the secondary vehicle electrical system.

The above object is also achieved by a method for operating a vehicle electrical system arrangement having the features of the inventive system arrangement having the following steps:
monitoring the operation of the primary vehicle electrical system,
changing over the switching apparatus from the primary switching position to the secondary switching, position in the event of identification of a malfunction in the secondary vehicle electrical system.

Further features and details of the invention that are described in connection with the vehicle electrical system arrangement according to aspects of the invention naturally also apply in connection with the method according to aspects of the invention, and respectively vice versa, so that reciprocal reference is, or can be, made throughout concerning the disclosure relating to the individual aspects of the invention.

According to aspects of the invention, a vehicle electrical system arrangement for a motor vehicle is provided. This vehicle electrical system arrangement has a battery apparatus to which a primary vehicle electrical system and at least one secondary vehicle electrical system are electrically conductively connected. The primary vehicle electrical system is equipped with a primary set of loads and the secondary vehicle electrical system with a secondary set of loads. Further, a backup battery is connected to the primary vehicle electrical system and to the secondary vehicle electrical system via a switching apparatus. The switching apparatus has at least one primary switching position for an electrically conductive connection to the primary vehicle electrical system and a secondary switching position for an electrically conductive connection to the secondary vehicle electrical system.

A vehicle electrical system arrangement according to aspects of the invention is thus armed at likewise providing a redundancy. For this purpose, two separate vehicle electrical systems in the form of a primary vehicle electrical system and in the form of a secondary vehicle electrical system are provided. The two vehicle electrical systems, that is to say the primary vehicle electrical system and the secondary vehicle electrical system, are electrically conductively connected to the battery apparatus. This connection may be provided either directly or indirectly via further electrical operational apparatuses. In particular, the electrically conductive connection is provided via the electrical converter for the respective vehicle electrical system, which will be explained in even more detail later.

Furthermore, there is provision in each vehicle electrical system not only for the electrical wiring but also for the applicable connection to a multiplicity of electrical loads. In this case, the electrical loads of the primary vehicle electrical system are combined in a primary set of loads. The electrical loads of the secondary vehicle electrical system are together referred to as a secondary set of loads. For the operability of the vehicle electrical system arrangement, at least one electrical load is provided for each of the primary set of loads and the secondary set of loads. Usually, however, there are particularly at least two electrical loads provided for the primary set of loads and at least two electrical loads provided for the secondary set of loads.

A core concept according to aspects of the invention is then distinguished in, that a backup battery can be provided as a common backup battery for the primary vehicle electrical system and for the secondary vehicle electrical system. Depending on the actual operating situation, the backup battery can now be provided firstly to support the primary vehicle electrical system and secondly to support the secondary vehicle electrical system. In the standard situation, the switching apparatus associated with the backup battery will be in the primary switching position and hence the backup battery will provide electrical support for the primary vehicle electrical system. In the event of failure of the secondary vehicle electrical system, the switching apparatus can be used to change over to the secondary switching position, so that now electrical support for the secondary vehicle electrical system by means of the backup battery becomes possible.

The use of a single common backup battery for supporting a primary vehicle electrical system and a secondary vehicle electrical system allows a separate second backup battery for supporting the secondary vehicle electrical system to be dispensed with. Dispensing with a second separate backup battery results in a high savings potential in respect of costs and weight and, furthermore, reduces the space requirement of such a vehicle electrical system arrangement. The redundancy as a result of the provision of two separate vehicle electrical systems, namely in the form of the primary vehicle electrical system and the secondary vehicle electrical system, is retained in the same manner as for the known solutions, however.

For the configuration of the vehicle electrical system arrangement, particular care is taken to ensure that the individual electrical loads are distributed meaningfully and advantageously over the two sets of loads and hence the two vehicle electrical systems. In particular, electrically important or safety-relevant electrical loads are preferably connected to the primary vehicle electrical system and hence as part of the primary set of loads. In the event of redundancy demands, connection to the two vehicle electrical systems is possible, in particular.

Further, it should be pointed out that the individual electrical loads are, in particular, functional loads of the vehicle and distinctly not drive motors in an electrical manner for electrically driven vehicles. An electrical load may be a sensor, an actuator or a controller, for example, in order to provide an automated or semi-automated driving functionality for the motor vehicle. For this, the battery apparatus can provide the applicable electrical power in the form of a high-voltage battery.

It may be advantageous if, in the case of a vehicle electrical system arrangement according to aspects of the invention, the switching apparatus has a monitoring apparatus for monitoring the operability of the two vehicle electrical systems and for controlling the primary switching position and the secondary switching position. A monitoring apparatus is used particularly to monitor the voltage situation and/or the current flow situation in the two vehicle electrical systems. As soon as the operability of the secondary vehicle electrical system is now limited and this also becomes identifiable by the monitoring apparatus, the control functionality, which may be configured as a controller/or regulatory function, can be used to change over the switching apparatus from the primary switching position to the secondary switching position by means of the monitoring apparatus. In this secondary switching position, the backup battery is thus now part of the second vehicle electrical system and is used to provide electrical support for the secondary vehicle electrical system in this special case on in this fault case.

A further advantage is obtainable if, in a vehicle electrical system arrangement according to aspects of the invention, the primary vehicle electrical system is electrically conductively connected to the battery apparatus via a primary transformer and the secondary vehicle electrical system is electrically conductively connected to the battery apparatus via a secondary transformer. In particular, the converters are electrical converters that are preferably configured as DC/DC converters. The two converters are in this case separate converters for the two systems and are particularly suited to controlling, or controlling and/or regulating, the applicable power decrease.

It is advantageous, furthermore, if, in a vehicle electrical system arrangement according to aspects of the invention, the primary transformer and/or the secondary transformer has a trimming apparatus for trimming the voltage between the primary vehicle electrical system and the secondary vehicle electrical system. Such a trimming apparatus is thus used particularly likewise for monitoring a functionality of the two vehicle electrical systems, particularly for monitoring the voltage in these two vehicle electrical systems. In order to ensure that simple, fast and above all safe change over of the switching apparatus of the backup battery becomes possible in the event of a fault, it is an arm for the voltage discrepancy between the primary vehicle electrical system and the secondary vehicle electrical system not to become too great. The trimming apparatus is used to equalize or trim this voltage discrepancy and preferably to keep it below a predefined trimming threshold value. In this case, the trimming apparatus may be part of one or both converters, but can also be configured as a separate apparatus.

It is furthermore advantageous if, in a vehicle electrical system arrangement accord g to aspects of the invention, at least one electrical load of the secondary set of loads is configured redundantly in relation to a corresponding electrical load of the primary set of loads. In addition or as an alternative to the solution as explained in the paragraph above, a safety-relevant electrical load may also be provided in a dual and hence redundant manner in the two sets of loads. Therefore, the redundancy is provided not only for the option to connect to the respective vehicle electrical system, but also for the operability of the respective safety-relevant electrical load.

Furthermore, it is advantageous if, in a vehicle electrical system arrangement according to aspects of the invention, the maximum power decrease of the electrical loads of the secondary set of loads is smaller than an associated power transfer of the electrical connection to the battery apparatus. The power transfer of this electrical connection is defined in an electrical manner particularly by the converter that has already been explained. As a result of the secondary vehicle electrical system now not being connected to the backup battery during standard operation, the intelligent reduction of the maximum power decrease of the electrical loads of the secondary set of loads ensures that a backup situation, which would require a backup battery, does not arise in the secondary vehicle electrical system either as a rule. As soon as an increased power decrease can also be recorded in the secondary vehicle electrical system in the event of a fault in the primary vehicle electrical system, however, this problem is rectified by the applicable changeover of the switching apparatus to the secondary switching position.

The subject matter of the present invention is likewise a method for operating a vehicle electrical system arrangement according to aspects of the invention, having the following steps:

monitoring the operation of the two vehicle electrical systems, changing over the switching apparatus from the primary switching position to the secondary switching position in the event of identification of a malfunction in the secondary vehicle electrical system.

The application of a method according to aspects of the invention to the operation of a vehicle electrical system arrangement according to aspects of the invention attains the same advantages as, have been explained in, detail with reference to a vehicle electrical system arrangement according to aspects of the invention.

A method according to aspects of the invention can be developed to the effect that the voltage in the primary vehicle electrical system and in the secondary vehicle electrical system is monitored and the two monitored voltages are trimmed. This avoids sudden voltage changes when the switching apparatus is changed over between the primary vehicle electrical system, on the one hand, and the secondary vehicle electrical system, on the other hand. This trimming can be correlated, for example, with a threshold value that predefines or permits a maximum voltage difference between the voltage of the primary vehicle electrical system and the voltage of the secondary vehicle electrical system.

BRIEF DESCRIPTION OF THE DRAWINGS

Further advantages, features and details of the invention arise from the description below in which exemplary embodiments of the invention are described in detail with reference to the drawings. In this case, the features mentioned in the claims and in the description may each be essential to the invention individually by themselves or in any combination. In the drawings:

DETAILED DESCRIPTION OF THE INVENTION

Figure 1:
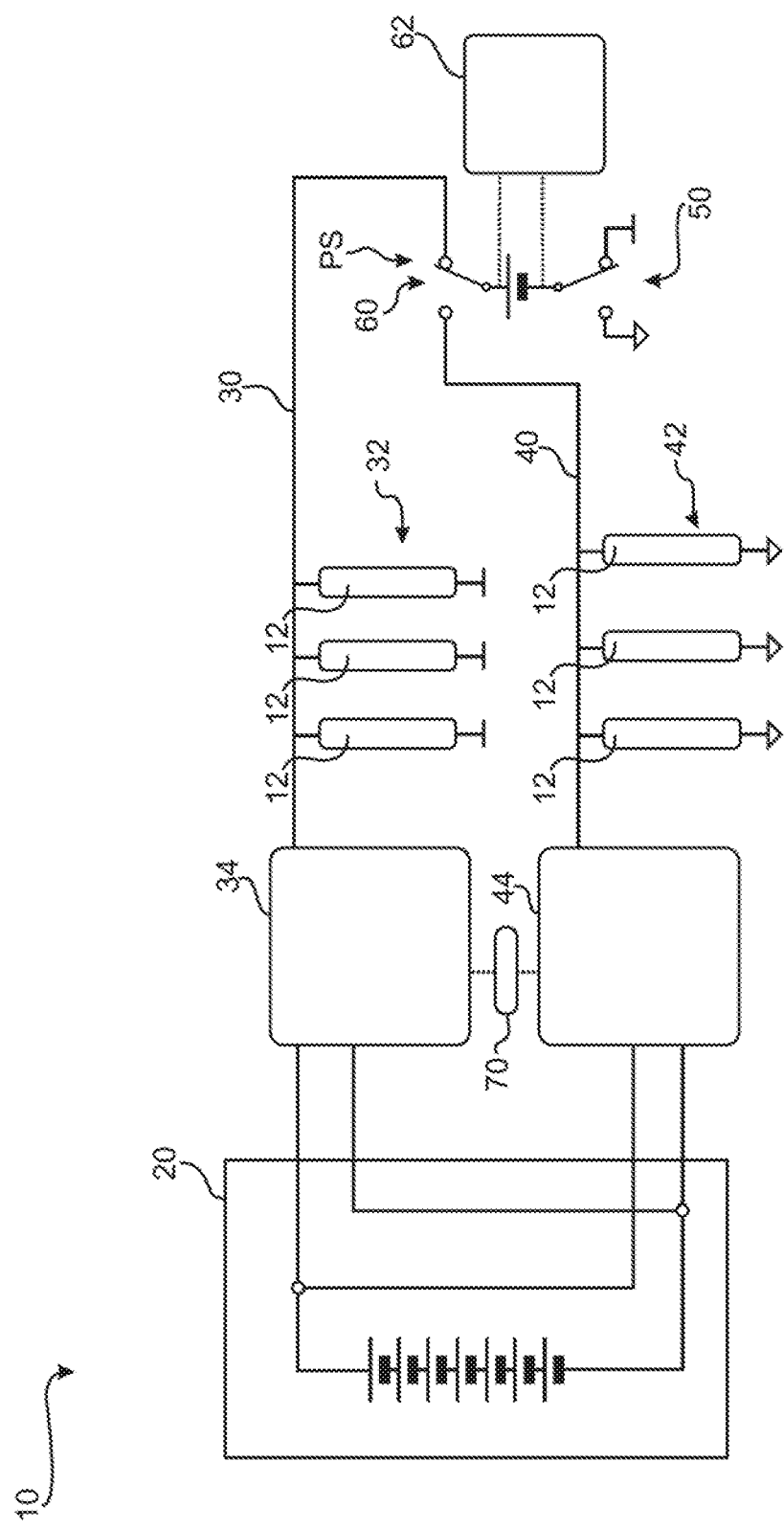
FIG. 1 schematically shows an embodiment of a vehicle electrical arrangement according to aspects of the invention, and FIG. 2 schematically shows the embodiment of FIG. 1 in the secondary switching, position.
Figure 2:
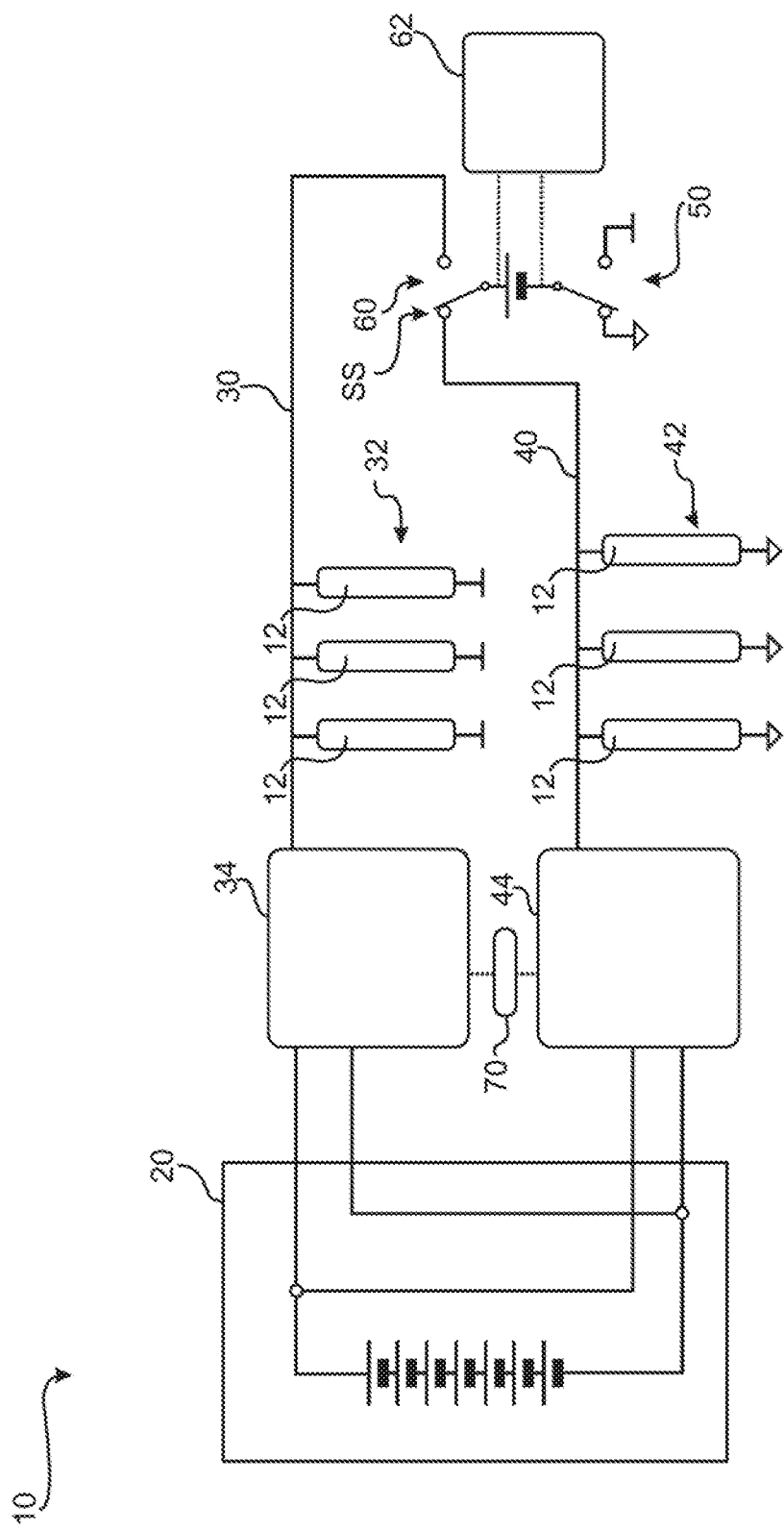

FIGS. 1 and 2 show a first embodiment of a vehicle electrical system arrangement 10 according to aspects of the invention. In this vehicle electrical system arrangement 10, a battery apparatus 20 in the form of a high-voltage battery is provided that provides sufficient electrical power for a multiplicity of electrical loads 12. In this case, the individual electrical loads 12 are distributed in an intelligent manner over two different vehicle electrical systems, namely the primary vehicle electrical system 30 and the secondary vehicle electrical system 40. Safety-relevant electrical loads 12 are assigned particularly to part of the primary set of loads 32 and hence to the primary vehicle electrical system 30. In order to ensure a corresponding power decrease from the battery apparatus 20, the primary vehicle electrical system 30 is electrically conductively connected to the battery apparatus 20 via a primary converter 34 and the secondary vehicle electrical system 40 is electrically conductively connected to the battery apparatus 20 via a secondary converter 44. During normal operation, a backup battery 50 is provided as a backup option for the primary vehicle electrical system 30 via a switching apparatus 60 with a primary switching position PS as shown in FIG. 1.

During normal operation, as shown by FIG. 1, the backup option is thus provided to the primary vehicle electrical system 30 in an electrical manner by the backup battery 50. If a malfunction, e.g. a voltage drop, in the secondary vehicle electrical system 40 is detected by means of a monitoring apparatus 62, however, then a switching apparatus 60 effects changeover to the secondary switching position SS. The applicable switching position is now shown for the embodiment of FIG. 1 by FIG. 2. In this case, the switching apparatus 60 is in the secondary switching position SS, which means that the electrical backup functionality by means of the backup battery 50 now has an effect on the secondary set of loads 42 and the secondary vehicle electrical system 40.

In addition to the pure changeover functionality, the embodiment of FIGS. 1 and 2 has provision for a trimming apparatus 70 between the primary converter 34 and the secondary converter 44. This trimming apparatus 70 is used to reduce the voltage difference between the primary vehicle electrical system 30 and the secondary vehicle electrical system 40 and particularly to keep it below a predefined trimming threshold. In the event of the changeover movement of the switching apparatus 60, as has already been explained with reference to FIGS. 1 and 2, this ensures that an undesirably high sudden voltage change is avoided during the changeover between the primary switching position PS and the secondary switching position SS.

The above explanation of the embodiments describes the invention only on the basis of examples. Naturally, individual features of the embodiments can, provided that it makes technical sense, be combined with one another freely without departing from the scope of the present invention.

What is claimed is:

1. In a vehicle electrical system arrangement for a motor vehicle, having a battery apparatus to which a primary vehicle electrical system and at least one secondary vehicle electrical system are electrically conductively connected, wherein the primary vehicle electrical system has a primary set of loads and the secondary vehicle electrical system has a secondary set of loads, wherein further a backup battery is connected to the primary vehicle electrical system and to the secondary vehicle electrical system via a switching apparatus, and the switching apparatus has at least one primary switching position for an electrically conductive connection to the primary vehicle electrical system and a secondary switching position for an electrically conductive connection to the secondary vehicle electrical system, wherein at least one electrical load of the secondary set of loads is configured redundantly in relation to a corresponding electrical load of the primary set of loads, and wherein said at least one electrical load is shared between the primary set of loads and the secondary set of loads, such that, during operation of the backup battery, the backup battery is configured to deliver power to said at least one electrical load regardless of the switching position of the switching apparatus, a method for operating the vehicle electrical system arrangement comprising:

monitoring the operation of the primary vehicle electrical system, and changing over the switching apparatus from the primary switching position to the secondary switching position in the event of identification of a malfunction in the secondary vehicle electrical system.

2. The method as claimed in claim 1, wherein the switching apparatus has a monitoring apparatus for monitoring at least the operability of the two vehicle electrical systems and for controlling the primary switching position and the secondary switching position.

3. The method as claimed in claim 1, wherein the primary vehicle electrical system is electrically conductively connected to the battery apparatus via a primary transformer and the secondary vehicle electrical system is electrically conductively connected to the battery apparatus via a secondary transformer.

4. The method as claimed in claim 3, wherein the primary transformer and/or the secondary transformer has a trimming apparatus for trimming the voltage between the primary vehicle electrical system and the secondary vehicle electrical system.

5. The method as claimed in claim 1, wherein the maximum power decrease of the electrical loads of the secondary set of loads is smaller than an associated power transfer of the electrical connection to the battery apparatus and/or of the secondary transformer.

6. The method as claimed in claim 1, further comprising the monitoring of the voltage in the primary vehicle electrical system and in the secondary vehicle electrical system and the trimming of the two monitored voltages.

7. The method as claimed in claim 1, further comprising changing over the backup battery to the secondary vehicle electrical system when the switching apparatus is changed over to the secondary switching position, to back up the electrical load of the secondary set of loads in the event of a fault in the secondary vehicle electrical system, as a result of a voltage drop in the secondary transformer.

* * * * *